(12) United States Patent
Ayukawa

(10) Patent No.: US 9,963,179 B2
(45) Date of Patent: May 8, 2018

(54) VEHICLE RESIN BACK DOOR INSTALLATION METHOD

(71) Applicant: TOYOTA JIDOSHA KABUSHIKI KAISHA, Toyota-shi, Aichi-ken (JP)

(72) Inventor: Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 14/797,856

(22) Filed: Jul. 13, 2015

(65) Prior Publication Data

US 2016/0082816 A1 Mar. 24, 2016

(30) Foreign Application Priority Data

Sep. 22, 2014 (JP) .................................. 2014-192864

(51) Int. Cl.
| | | |
|---|---|---|
| *B62D 65/02* | (2006.01) | |
| *B62D 65/06* | (2006.01) | |
| *B60J 10/00* | (2016.01) | |

(52) U.S. Cl.
CPC ........... *B62D 65/026* (2013.01); *B62D 65/06* (2013.01)

(58) Field of Classification Search
CPC .... B62D 65/026; B62D 65/06; B62D 65/024; B60J 10/45; B60J 5/0472; B60J 5/0481; B21D 39/021; Y10T 29/49622; Y10T 29/49902
USPC .................................... 49/502; 296/56, 146.8
See application file for complete search history.

(56) References Cited

U.S. PATENT DOCUMENTS

| | | | | |
|---|---|---|---|---|
| 4,822,098 A | * | 4/1989 | Vogt ......................... | B60J 5/101 296/146.5 |
| 5,966,801 A | * | 10/1999 | Wu ........................ | B62D 65/06 29/281.5 |
| 6,018,916 A | | 2/2000 | Henry | |
| 6,122,813 A | * | 9/2000 | Roy ....................... | B62D 65/06 29/281.1 |

(Continued)

FOREIGN PATENT DOCUMENTS

| | | |
|---|---|---|
| CN | 201309134 Y | 9/2009 |
| JP | 2003-095158 A | 4/2003 |

(Continued)

OTHER PUBLICATIONS

Feb. 9, 2018 Office Action issued in Chinese Patent Application No. 2015104278133.

*Primary Examiner* — Ryan J Walters
*Assistant Examiner* — Lawrence Averick
(74) *Attorney, Agent, or Firm* — Oliff PLC

(57) ABSTRACT

A vehicle resin back door installation method includes: a vehicle body-side positioning step of attaching first positioning jigs to a vehicle body, and forming first sloping surfaces; a back door-side positioning step of attaching second positioning jigs to a back door, and forming second sloping surfaces; a temporary placing step of bringing the second sloping surfaces into contact with the first sloping surfaces, at the same time temporarily placing the back door on the vehicle body, and centering the back door in the vehicle width direction with respect to the vehicle body; an attaching step of attaching the back door to the vehicle body; and a detaching step of detaching the first positioning jigs from the vehicle body and detaching the second positioning jigs from the back door.

4 Claims, 7 Drawing Sheets

(56) References Cited

U.S. PATENT DOCUMENTS

| | | | |
|---|---|---|---|
| 6,209,186 B1* | 4/2001 | Hui | B25B 27/0035 |
| | | | 29/271 |
| 7,270,863 B2* | 9/2007 | Harima | B60J 5/00 |
| | | | 264/478 |
| 8,403,399 B2* | 3/2013 | Kuntze | B60J 5/107 |
| | | | 296/146.6 |
| 8,690,220 B2* | 4/2014 | Tsukiyama | B60J 5/101 |
| | | | 296/106 |
| 8,832,940 B2* | 9/2014 | Sarh | B21J 15/14 |
| | | | 269/8 |
| 8,939,745 B2* | 1/2015 | Fox | B29C 43/02 |
| | | | 425/112 |
| 9,149,961 B2* | 10/2015 | Fox | B29C 43/02 |
| 2002/0024008 A1* | 2/2002 | Iizuka | G02B 26/123 |
| | | | 250/234 |
| 2007/0001484 A1* | 1/2007 | Okamoto | B62D 25/161 |
| | | | 296/193.05 |
| 2017/0182729 A1* | 6/2017 | Fox | B32B 3/08 |

FOREIGN PATENT DOCUMENTS

| | | |
|---|---|---|
| JP | 3767335 B2 | 4/2006 |
| JP | 2010-069993 A | 4/2010 |
| JP | 2011-121479 A | 6/2011 |

\* cited by examiner

VEHICLE RESIN BACK DOOR INSTALLATION METHOD

CROSS-REFERENCE TO RELATED APPLICATION

This application claims priority under 35 USC 119 from Japanese Patent Application No. 2014-192864 filed Sep. 22, 2014, the disclosure of which is incorporated by reference herein.

BACKGROUND

Technical Field

The present invention relates to a vehicle resin back door installation method.

Related Art

Conventionally, a method of installing a resin back door has been known which comprises gripping a resin back door from a vehicle body rear side with a gripping hand coupled to an assist device, placing the resin back door on a vehicle body in a state in which the resin back door is slightly opened with respect to an open portion in a vehicle body rear portion, thereafter moving the resin back door in a closing direction with respect to the open portion and at the same time adjusting the position of the resin back door with respect to the vehicle body using positioning jigs attached to the vehicle body or the resin back door, and fastening the resin back door to the vehicle body (e.g., see Japanese Patent Application Laid-open (JP-A) No. 2003-95158).

When the back door is made of resin, the amount of deformation at the plastic regions of the resin material is small, so positional adjustment utilizing plastic deformation cannot be performed. For that reason, when installing the back door made of resin in the vehicle body, positioning jigs become necessary, but there is still room for improvement in terms of ensuring that the back door is easily positioned and installed using simplified positioning jigs.

SUMMARY

The present invention provides a vehicle resin back door installation method that ensures that the back door made of resin is easily positioned with respect to and installed in the vehicle body using simplified positioning jigs.

A vehicle resin back door installation method of a first aspect of the present invention is a method of centering a back door made of resin in a vehicle width direction with respect to a vehicle body made of metal and installing the back door in the vehicle body using a right and left pair of first positioning jigs attached to the vehicle body and a right and left pair of second positioning jigs attached to the back door, the vehicle resin back door installation method including: a vehicle body-side positioning step of detachably attaching the first positioning jigs to the vehicle body, and forming first sloping surfaces, that slope from a vehicle body upper side downward and inward in the vehicle width direction, at the first positioning jigs; a back door-side positioning step of detachably attaching the second positioning jigs to the back door, and forming second sloping surfaces, that slope from a vehicle body lower side upward and outward in the vehicle width direction, at the second positioning jigs in an installation posture of the back door with respect to the vehicle body; a temporary placing step of bringing the second sloping surfaces into contact with the first sloping surfaces, at the same time temporarily placing the back door on the vehicle body, and centering the back door in the vehicle width direction with respect to the vehicle body; an attaching step of attaching the back door via hinge members to the vehicle body; and a detaching step of detaching the first positioning jigs from the vehicle body and detaching the second positioning jigs from the back door.

According to the first aspect of the present invention, the back door is centered in the vehicle width direction with respect to the vehicle body by bringing the second sloping surfaces of the second positioning jigs, which slope from the vehicle body lower side upward and outward in the vehicle width direction, into contact with the first sloping surfaces of the first positioning jigs, which slope from the vehicle body upper side downward and inward in the vehicle width direction, and at the same time temporarily placing the back door on the vehicle body. Consequently, the configurations of the first positioning jigs and the second positioning jigs are simplified, and the back door is easily positioned with respect to and installed in the vehicle body using the first positioning jigs and the second positioning jigs. That is, the back door made of resin can be easily positioned with respect to and installed in the vehicle body using the simplified first positioning jigs and second positioning jigs.

Furthermore, a method of installing a resin back door for a vehicle of a second aspect of the present invention is the first aspect, wherein first magnets are disposed on the first positioning jigs, second magnets are disposed on the second positioning jigs and metal members are disposed on the back door, in the vehicle body-side positioning step the first positioning jigs are attracted to and held on the vehicle body by the magnetic force of the first magnets, and in the back door-side positioning step the second positioning jigs are attracted to and held on the metal members via the back door by the magnetic force of the second magnets.

According to the second aspect of the present invention, in the vehicle body-side positioning step the first positioning jigs are attracted to and held on the vehicle body by the first magnets, and in the back door-side positioning step the second positioning jigs are attracted to and held on the metal members via the back door by the second magnets. Consequently, the first positioning jigs are easily attached to and detached from the vehicle body, and the second positioning jigs are easily attached to and detached from the back door.

Furthermore, a method of installing a resin back door for a vehicle of a third aspect of the present invention is the first aspect, wherein first pins are disposed projecting on the first positioning jigs and first hole portions are formed at the vehicle body, second pins are disposed projecting on the second positioning jigs and second hole portions are formed at the back door, in the vehicle body-side positioning step the first positioning jigs are positioned with respect to the vehicle body with the first pins being inserted into the first hole portions, and in the back door-side positioning step the second positioning jigs are positioned with respect to the back door with the second pins being inserted into the second hole portions.

According to the third aspect of the present invention, in the vehicle body-side positioning step the first pins of the first positioning jigs are inserted into the first hole portions of the vehicle body, and in the back door-side positioning step the second pins of the second positioning jigs are inserted into the second hole portions of the back door. Consequently, the first positioning jigs are easily positioned with respect to the vehicle body, and the second positioning jigs are easily positioned with respect to the back door.

BRIEF DESCRIPTION OF THE DRAWINGS

An exemplary embodiment of the present invention will be described in detail based on the following figures, wherein.

DETAILED DESCRIPTION

Figure 1:
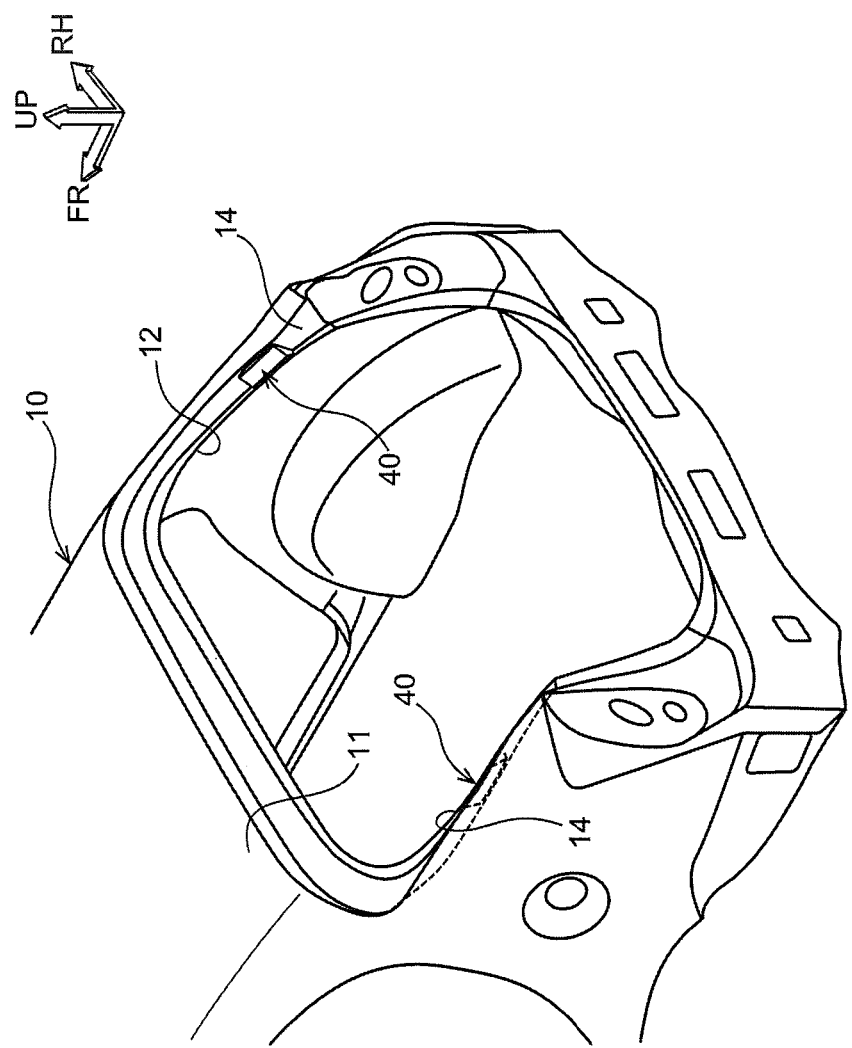
FIG. 1 is a perspective view showing the rear portion of a vehicle body equipped with positioning jigs pertaining to the embodiment.

An embodiment pertaining to the present invention will be described in detail below on the basis of the drawings. For convenience of description, arrow UP appropriately shown in the drawings indicates a vehicle body upward direction, arrow FR indicates a vehicle body frontward direction, and arrow RH indicates a vehicle body rightward direction. Furthermore, when up and down, front and rear, and right and left are used without further specification in the following description, these will be understood to mean up and down in the vehicle body up and down direction, front and rear in the vehicle body front and rear direction, and right and left in the vehicle body right and left direction (vehicle width direction).

As shown in FIG. 1, a vehicle body 10 made of metal has an open portion 12 formed at its rear portion side. The open portion 12 is opened and closed by a back door 20 made of resin shown in FIG. 3. Additionally, a right and left pair of first positioning jigs 40 are detachably attached at predetermined positions in troughs 14, which are disposed on both the right and left sides of the vehicle body 10 and configure the open portion 12.

Figure 2:
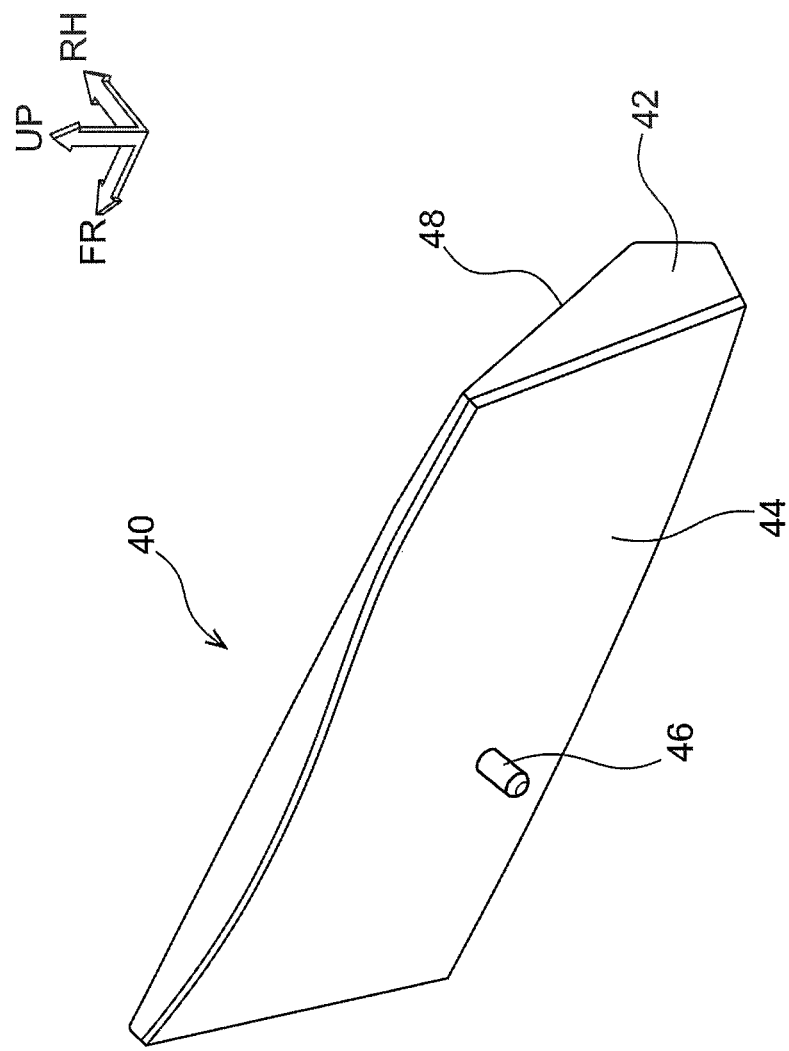
FIG. 2 is a perspective view showing a positioning jig on the vehicle body side pertaining to the embodiment.

Specifically, as shown in FIG. 2, the first positioning jigs 40 each have a first main body portion 42, which is made of a lightweight and strong resin material (e.g., ABS) and molded in a rectangular shape, and a first magnet 44, which is integrally attached by insert molding to one surface (the outer surface) of the first main body portion 42.

The outer surfaces of the first magnets 44 are formed in shapes conforming to the shapes of the right and left troughs 14, and are formed so as to be bilaterally symmetrical. In other words, the first positioning jigs 40 include one for the right and one for the left. Additionally, a cylindrical first pin 46 is integrally disposed projecting on the substantially center portion of the outer surface of each of the first magnets 44.

Figure 6:
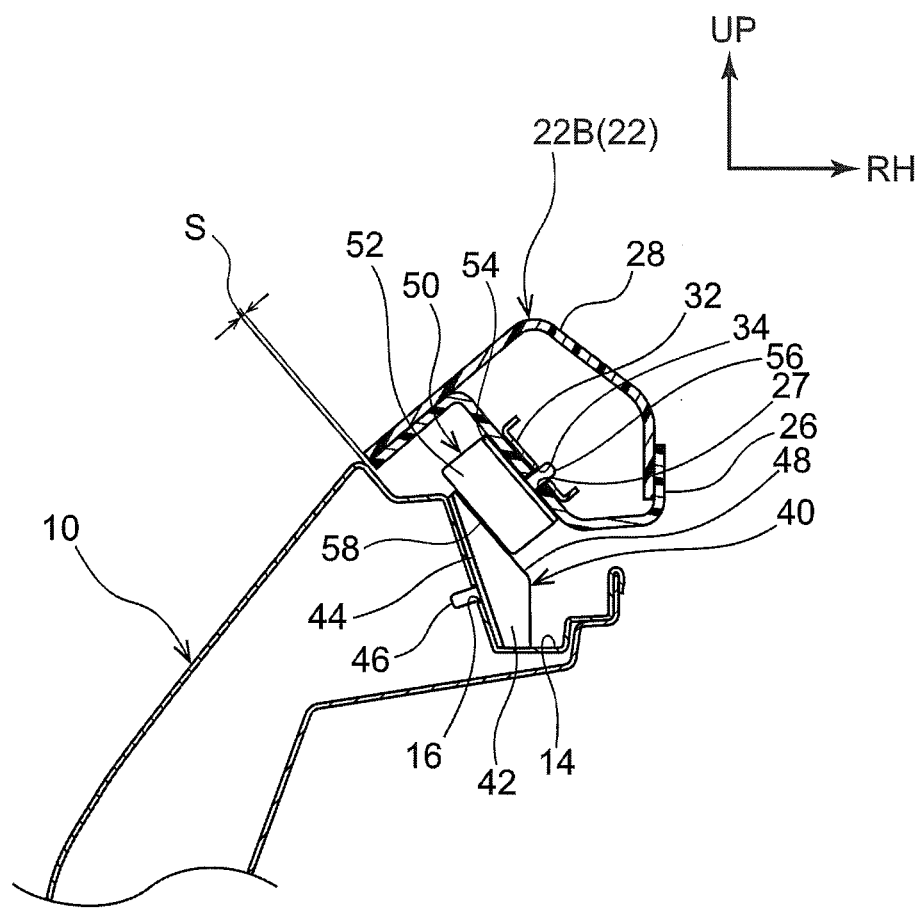
FIG. 6 is a cross-sectional view seen from the direction of the arrows associated with line X-X in FIG. 5.

Furthermore, as shown in FIG. 6, circular first hole portions 16 into which the first pins 46 are inserted are formed at the troughs 14, and the inner diameter of the first hole portions 16 is the same as the outer diameter of the first pins 46. Consequently, the first positioning jigs 40 are positioned as a result of the first pins 46 being inserted into the first hole portions 16, and at the same time the first positioning jigs 40 are detachably attracted to and held in the troughs 14 of the vehicle body 10 by the magnetic force of the first magnets 44.

Furthermore, as shown in FIG. 2 and FIG. 6, the upper portion sides of the other surfaces (the inner surfaces) of the first main body portions 42 are first sloping surfaces 48 that slope from the vehicle body upper side downward and inward in the vehicle width direction in a state in which the first positioning jigs 40 have been attached to the troughs 14 of the vehicle body 10. Numerous tiny bumps are formed on the first sloping surfaces 48 so that the surface roughness of the first sloping surfaces 48 is made relatively rough. Because of this, the friction (sliding resistance) of later-described second sloping surfaces 58 with respect to the first sloping surfaces 48 is reduced.

Figure 3:
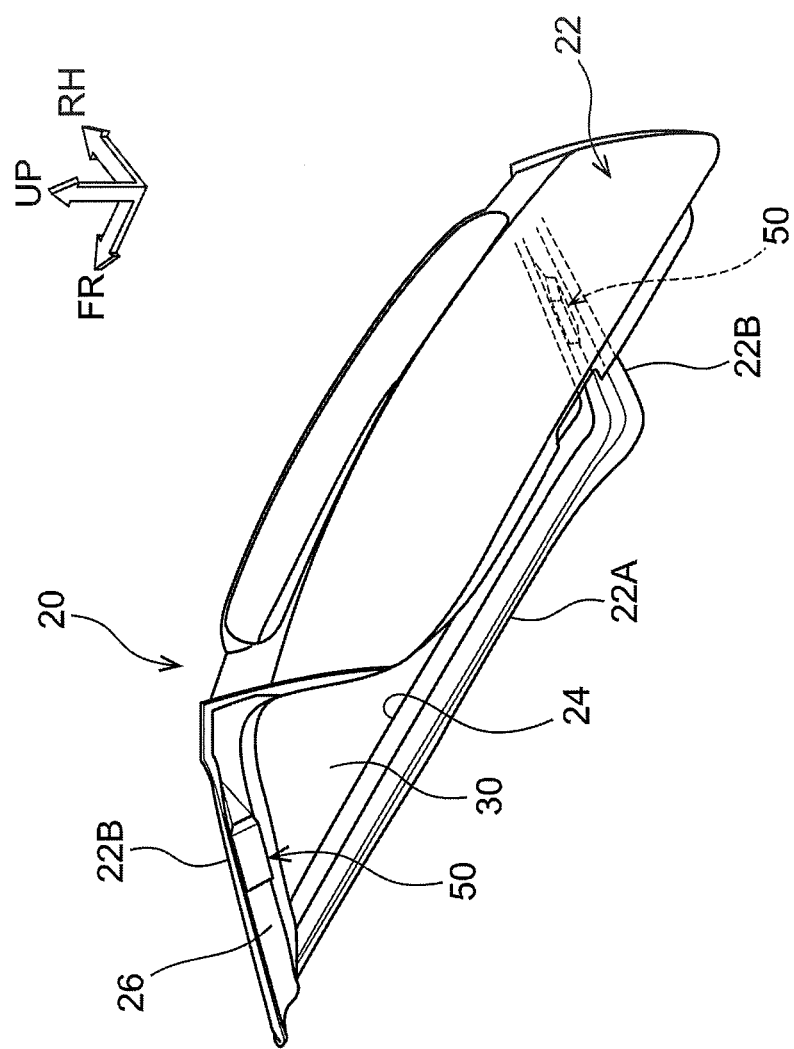
FIG. 3 is a perspective view showing a back door equipped with positioning jigs pertaining to the embodiment.

Turning now to FIG. 3, the back door 20 has a back door panel 22 and a back window glass 30, which is disposed so as to close off a substantially rectangular shaped open portion 24 formed at the back door panel 22. As shown in FIG. 6, the back door panel 22 is configured as a result of inner panels 26 and outer panels 28 made of carbon fiber-reinforced plastic (CFRP), for example, being joined to one another at their outer peripheral edge portions and at their inner peripheral edge portions, which configure the open portion 24.

Consequently, the back door panel 22 is configured in a closed cross-sectional shape at least at an upper side edge portion 22A (see FIG. 3) and both side edge portions 22B (see FIG. 3), which configure the open portion 24. Additionally, as shown in FIG. 6, damper retainers 32 made of metal and serving as metal members are disposed inside the closed cross section in the edge portions 22B on both sides of the back door panel 22.

Figure 5:
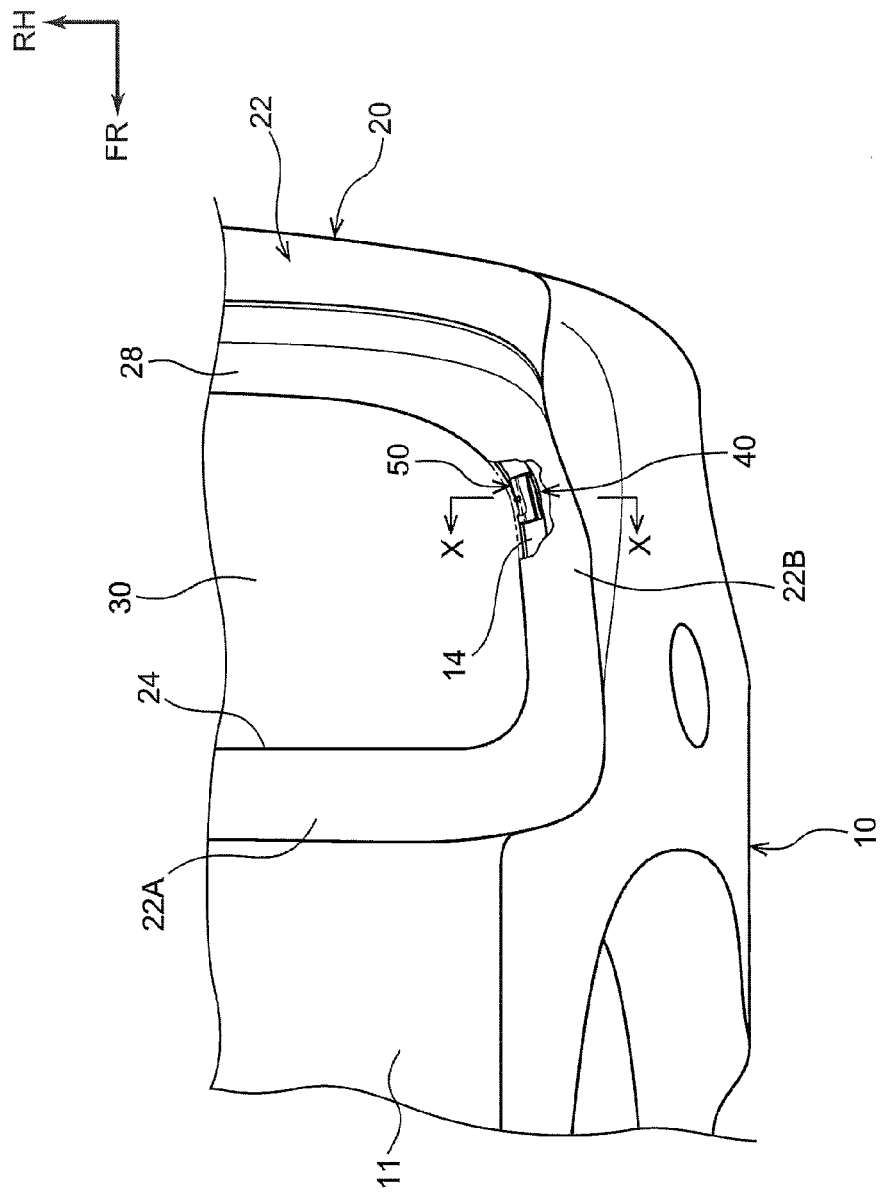
FIG. 5 is a plan view showing a state in which the back door has been positioned in the vehicle width direction with respect to the vehicle body using the positioning jigs pertaining to the embodiment.

Specifically, damper retainers 32 for attaching dampers (not illustrated in the drawings) that bridge the vehicle body 10 and the back door 20 are fastened by non-illustrated bolts and nuts or rivets to the inner surfaces of the inner panels 26 at predetermined positions on the edge portions 22B of the back door panel 22. Additionally, as shown in FIG. 3, FIG. 5, and FIG. 6, a right and left pair of second positioning jigs 50 are detachably attached to the outer surfaces of the inner panels 26 on whose inner surfaces the damper retainers 32 are disposed.

Figure 4:
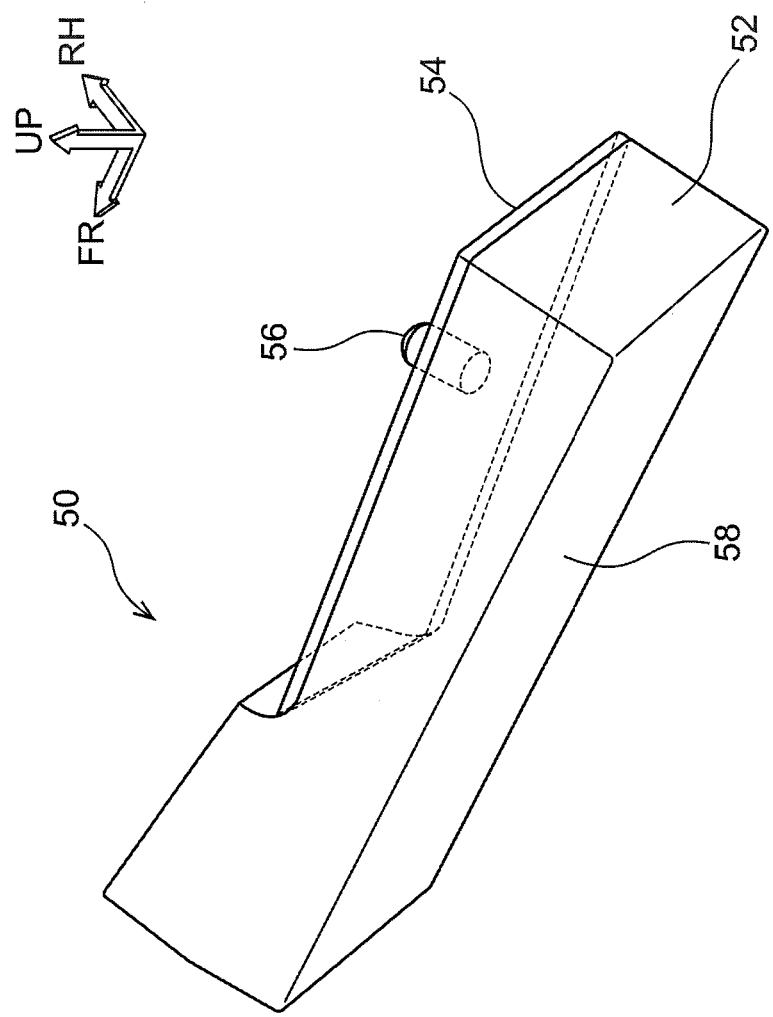
FIG. 4 is a perspective view showing a positioning jig on the back door side pertaining to the embodiment.

Specifically, as shown in FIG. 4, the second positioning jigs 50 each have a second main body portion 52, which is made of a lightweight and strong resin material (e.g., ABS) and molded in a rectangular shape, and a second magnet 54, which is integrally attached by insert molding to one surface (the outer surface) of the second main body portion 52.

The outer surfaces of the second magnets 54 are formed in shapes conforming to the shape of the right and left inner panels 26, and are formed so as to be bilaterally symmetrical. In other words, the second positioning jigs 50 also include one for the right and one for the left. Additionally, a cylindrical second pin 56 is integrally disposed projecting on the substantially center portion of the outer surface of each of the second magnets 54.

Furthermore, as shown in FIG. 6, circular second hole portions 27 and 34 into which the second pins 56 are inserted are formed at the inner panels 26 and the damper retainers 32, and the inner diameter of the second hole portions 27 and 34 is the same as the outer diameter of the second pins 56. Consequently, the second positioning jigs 50 are positioned as a result of the second pins 56 being inserted into the second hole portions 27 and 34, and at the same time the second positioning jigs 50 are detachably attracted to and held on the damper retainers 32 via the inner panels 26 by the magnetic force of the second magnets 54.

Furthermore, as shown in FIG. 4 and FIG. 6, the other surfaces (the inner surfaces) of the second main body portions 52 are second sloping surfaces 58 that slope from the vehicle body lower side upward and outward in the vehicle width direction in a state in which the second positioning jigs 50 have been attached to the inner panels 26 and in an installation posture of the back door 20 with respect to the vehicle body 10 shown in FIG. 5. Numerous tiny bumps may also be formed on the second sloping surface 58, and the surface roughness of the second sloping surfaces 58 may also be made relatively rough.

Specifically, as shown in FIG. 6, the angle of inclination of the second sloping surfaces 58 with respect to the vertical direction is the same as the angle of inclination of the first sloping surfaces 48 with respect to the vertical direction. Consequently, the second sloping surfaces 58 closely contact the first sloping surfaces 48, with no gap in between. However, in order for the back door 20 to be easily centered in the vehicle width direction with respect to the vehicle body 10, it is necessary to make it easier for the second sloping surfaces 58 to slide with respect to the first sloping surfaces 48.

Therefore, the surface roughness of at least one of the first sloping surfaces 48 and the second sloping surfaces 58 is relatively roughened to thereby reduce the area of contact between them. Because of this, the fiction (sliding resistance) of the second sloping surfaces 58 with respect to the first sloping surfaces 48 is reduced. The friction reducing means for reducing the friction of the second sloping surfaces 58 with respect to the first sloping surfaces 48 is not limited to this.

Figure 7:
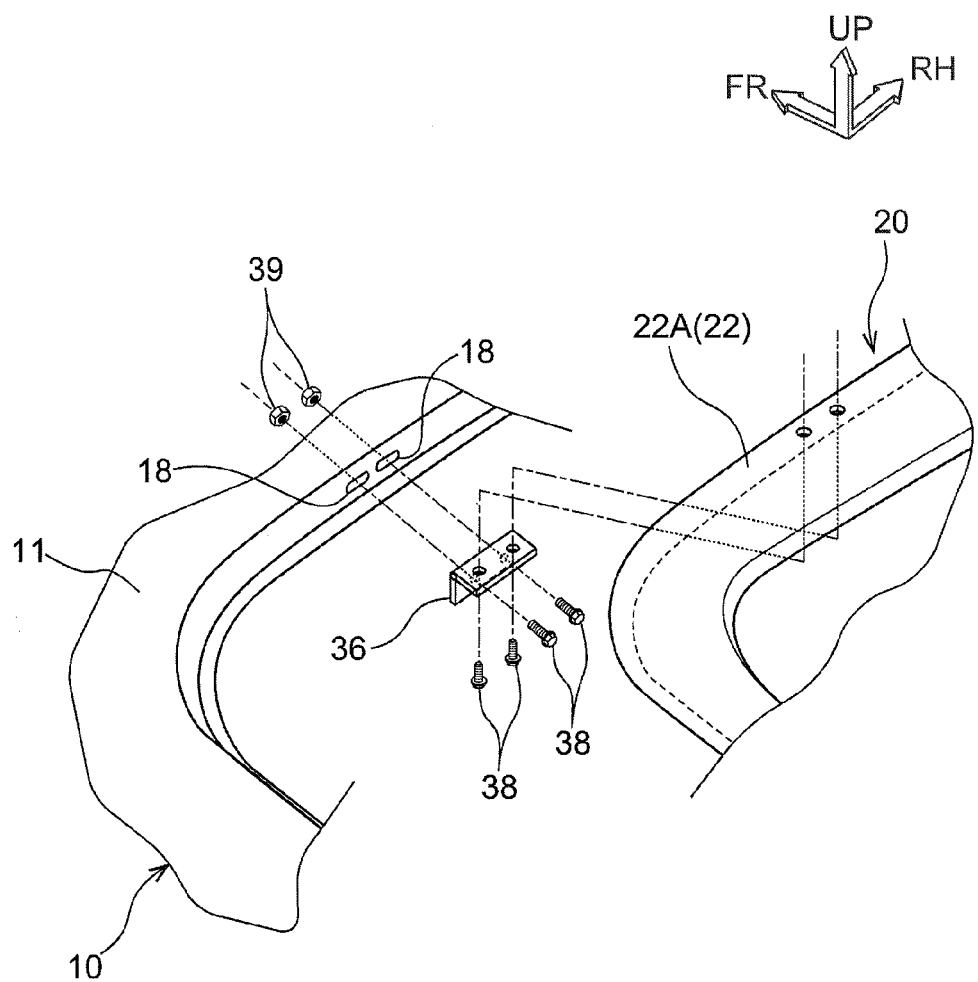
FIG. 7 is an exploded perspective view showing configurations around and including a hinge member that fastens the back door centered in the vehicle width direction to the vehicle body.

Furthermore, as shown in FIG. 7, the edge portion 22A on the upper side of the back door panel 22 of the back door 20 is attached to a roof 11 of the vehicle body 10 via hinge members 36. Specifically, one portion (the rear portion) of each of the hinge members 36 is fastened, via the inner panels 26 at the upper side edge portion 22A, by bolts 38 and nuts (not illustrated in the drawings) to metal members (not illustrated in the drawings) disposed on the inner surfaces of the inner panels 26.

Additionally, the other portion (the front portion) of each of the hinge members 36 is fastened, via long hole portions 18 formed two each on the right and left sides of the rear end portion of the roof 11 of the vehicle body 10, by bolts 38 and nuts 39. The lengthwise direction of the long hole portions 18 formed at the rear end portion of the roof 11 coincides with the vehicle width direction so as to be able to accommodate positional adjustment of the back door 20 that is centered in the vehicle width direction with respect to the vehicle body 10 by the first positioning jigs 40 and the second positioning jigs 50.

Next, the action of the vehicle body 10 and the back door 20 (a method of installing the back door 20 in the vehicle body 10) having the configurations described above will be described.

First, as shown in FIG. 1, the first positioning jigs 40 are attached to the troughs 14 on both the right and left sides of the vehicle body 10. That is, as shown in FIG. 6, the right and left first positioning jigs 40 are positioned by inserting the first pins 46 into the first hole portions 16, and at the same time the first positioning jigs 40 are attracted to and held in the right and left troughs 14 by the magnetic force of the first magnets 44 (a vehicle body-side positioning step).

Because the shapes of the first magnets 44 of the right and left first positioning jigs 40 conform to the shapes of the right and left troughs 14, the right and left first positioning jigs 40 can be easily positioned with respect to the right and left troughs 14 (the vehicle body 10) by simply inserting the first pins 46 into the first hole portions 16.

Meanwhile, as shown in FIG. 3, the second positioning jigs 50 are attached to the right and left edge portions 22B of the back door 20 (the back door panel 22). That is, as shown in FIG. 6, the right and left second positioning jigs 50 are positioned by inserting the second pins 56 into the second hole portions 27 and 34, and at the same time the second positioning pins 50 are attracted to and held on, via the inner panels 26, the damper retainers 32 on the right and left edge portions 22B by the magnetic force of the second magnets 54 (a back door-side positioning step).

Because the shapes of the second magnets 54 of the right and left second positioning jigs 50 conform to the shapes of the right and left inner panels 26, the right and left second positioning jigs 50 can be easily positioned with respect to the right and left inner panels 26 (the back door 20) by simply inserting the second pins 56 into the second hole portions 27 and 34.

Furthermore, the second positioning jigs 50 are attracted and held utilizing the damper retainers 32 disposed on the inner surfaces of the inner panels 26, so compared to a configuration where separate metal members for attracting and holding the second positioning jigs 50 are disposed on the inner surfaces of the inner panels 26, an increase in the number of parts can be controlled or prevented and the second positioning jigs 50 can be efficiently attached.

Thereafter, as shown in FIG. 5 and FIG. 6, the back door 20 is temporarily placed on and installed in the vehicle body 10. When the back door 20 has been temporarily placed, the second sloping surfaces 58 of the second positioning jigs 50 are brought into contact with the first sloping surfaces 48 of the first positioning jigs 40. Here, the friction (sliding resistance) of the second sloping surfaces 58 with respect to the first sloping surfaces 48 is reduced.

Consequently, the back door 20 moves downward along the first sloping surfaces 48 of the first positioning jigs 40 via the second sloping surfaces 58 of the second positioning jigs 50 and stops when it becomes positioned in the vehicle width direction center portion with respect to the vehicle body 10. Because of this, the back door 20 is centered in the vehicle width direction with respect to the vehicle body 10, and a space S (see FIG. 6) in the vehicle width direction between the vehicle body 10 and the back door 20 is precisely set (a temporary placing step).

Once the back door 20 has been centered in the vehicle width direction with respect to the vehicle body 10 in this way, as shown in FIG. 7, the rear portions of the hinge members 36 are fastened to the edge portion 22A on the upper side of the back door panel 22, and the front portions of the hinge members 36 are fastened to the rear end portion of the roof 11 of the vehicle body 10 (an attaching step). Here, the long hole portions 18 whose lengthwise direction coincides with the vehicle width direction are formed at the rear end portion of the roof 11. Consequently, even if the position of the back door 20 in the vehicle width direction is adjusted with respect to the vehicle body 10, the back door 20 can be fastened with good positional precision to the vehicle body 10.

Once the back door 20 has been fastened to the vehicle body 10, the first positioning jigs 40 are detached from the troughs 14 of the vehicle body 10 and the second positioning jigs 50 are detached from the inner panels 26 of the back door 20 (the back door panel 22) (a detaching step). At this time, the first positioning jigs 40 and the second positioning jigs 50 can be easily detached by hand because they are simply attracted to and held in the troughs 14 of the vehicle body 10 and on the inner panels 26 of the back door 20 by the magnetic force of the first magnets 44 and the second magnets 54.

After the above steps, the work of installing the back door 20 in the vehicle body 10 using the first positioning jigs 40 and the second positioning jigs 50 ends. In this way, according to the installation method pertaining to the present embodiment, the back door 20 can be easily positioned with respect to and installed in the vehicle body 10 using the simplified first positioning jigs 40 and second positioning jigs 50. Additionally, the space S between the vehicle body 10 and the back door 20 can be precisely set, so the visual quality of the back door 20, which is also a design part, can be improved.

Non-illustrated first cushion rubbers and second cushion rubbers may also be attached in the predetermined positions of the troughs 14 from which the first positioning jigs 40 have been detached and the predetermined positions of the inner panels 26 from which the second positioning jigs 50 have been detached. Consequently, the back door 20 may also be centered in the vehicle width direction with respect to the vehicle body 10 using the first cushion rubbers and the second cushion rubbers instead of the first positioning jigs 40 and the second positioning jigs 50.

In this case, it is preferred that a surface treatment for reducing friction (sliding resistance) be administered to the first sloping surfaces formed on the first cushion rubbers and the second sloping surfaces formed on the second cushion rubbers. Furthermore, when given this configuration, the first positioning jigs 40 and the second positioning jigs 50 become unnecessary, so there are the advantages that the number of parts can be reduced and the detaching step is omitted.

A method of installing the vehicle resin back door 20 pertaining to the present embodiment has been described above on the basis of the drawings, but the method of installing the vehicle resin back door 20 pertaining to the present embodiment is not limited to what is illustrated in the drawings and can undergo appropriate design changes without departing from the spirit of the present invention.

For example, it suffices for the back door panel 22 configuring the back door 20 together with the back window glass 30 to be made of resin, and the back door panel 22 is not limited to being made of carbon fiber-reinforced plastic (CFRP). However, when the back door panel 22 (the inner panels 26 and the outer panels 28) is molded using carbon fiber-reinforced plastic (CFRP), the back door panel 22 can be made lightweight and strong.

Furthermore, it suffices for the first positioning jigs 40 and the second positioning jigs 50 to be easily attachable to and detachable from the troughs 14 of the vehicle body 10 and the inner panels 26 of the back door 20 (the back door panel 22), and the first positioning jigs 40 and the second positioning jigs 50 are not limited to being attracted and held by the magnetic force of the first magnets 44 and the second magnets 54.

Furthermore, it suffices for the first positioning jigs 40 and the second positioning jigs 50 to be able to be easily positioned in the troughs 14 of the vehicle body 10 and on the inner panels 26 of the back door 20 (the back door panel 22), and the first positioning jigs 40 and the second positioning jigs 50 are not limited to positioning resulting from the first pins 46 inserted into the first hole portions 16 and the second pins 56 inserted into the second hole portions 27 and 34.

Furthermore, the first pins 46 and the second pins 56 may also be disposed projecting on the first main body portions 42 and the second main body portions 52. In that case, it suffices for through holes (not illustrated in the drawings) through which the first pins 46 and the second pins 56 are passed to be formed at the first magnets 44 and the second magnets 54.

What is claimed is:

1. A vehicle resin back door installation method of centering a back door made of resin in a vehicle width direction with respect to a vehicle body made of metal and installing the back door in the vehicle body using a right and left pair of first positioning jigs attached to the vehicle body and a right and left pair of second positioning jigs attached to the back door, the vehicle resin back door installation method comprising:
    a vehicle body-side positioning step of detachably attaching the first positioning jigs to the vehicle body, and forming first sloping surfaces, that slope from a vehicle body upper side downward and inward in the vehicle width direction, at the first positioning jigs;
    a back door-side positioning step of detachably attaching the second positioning jigs to the back door, and forming second sloping surfaces, that slope from a vehicle body lower side upward and outward in the vehicle width direction, at the second positioning jigs in an installation posture of the back door with respect to the vehicle body;
    a temporary placing step of bringing the second sloping surfaces into contact with the first sloping surfaces, at the same time temporarily placing the back door on the vehicle body, and centering the back door in the vehicle width direction with respect to the vehicle body;
    an attaching step of attaching the back door via hinge members to the vehicle body; and
    a detaching step of detaching the first positioning jigs from the vehicle body and detaching the second positioning jigs from the back door, wherein the detaching of the first positioning jigs occurs after the steps of detachably attaching the first and the second positioning jigs, and after the step of attaching the back door.

2. The vehicle resin back door installation method according to claim 1, wherein
    first magnets are disposed on the first positioning jigs,
    second magnets are disposed on the second positioning jigs and metal members are disposed on the back door,
    in the vehicle body-side positioning step the first positioning jigs are attracted to and held on the vehicle body by the magnetic force of the first magnets, and
    in the back door-side positioning step the second positioning jigs are attracted to and held on the metal members via the back door by the magnetic force of the second magnets.

3. The vehicle resin back door installation method according to claim 1, wherein
    first pins are disposed projecting on the first positioning jigs and first hole portions are formed at the vehicle body,
    second pins are disposed projecting on the second positioning jigs and second hole portions are formed at the back door, in the vehicle body-side positioning step the first positioning jigs are positioned with respect to the vehicle body with the first pins being inserted into the first hole portions, and in the back door-side positioning step the second positioning jigs are positioned with respect to the back door with the second pins being inserted into the second hole portions.

4. The vehicle resin back door installation method according to claim 1, wherein the temporary placing step includes bringing the second sloping surfaces into direct contact with the first sloping surfaces.

\* \* \* \* \*